March 13, 1962 — A. J. MADONNA — 3,024,671
AUTOMATIC DRILLING APPLIANCE FEEDING ATTACHMENT
Filed Nov. 3, 1958 — 2 Sheets-Sheet 1
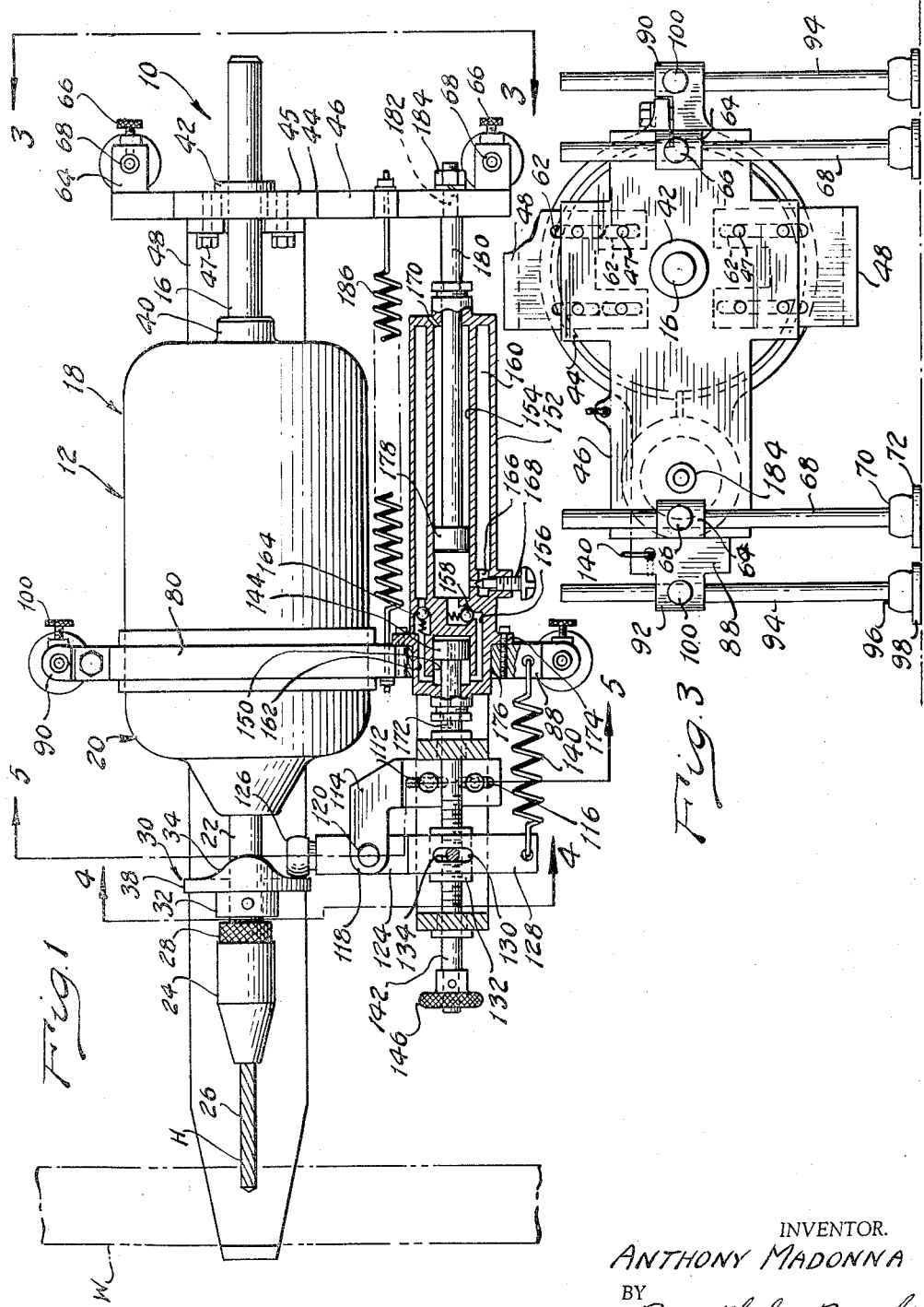
INVENTOR.
ANTHONY MADONNA
BY Barthel & Bugbee
ATTYS.

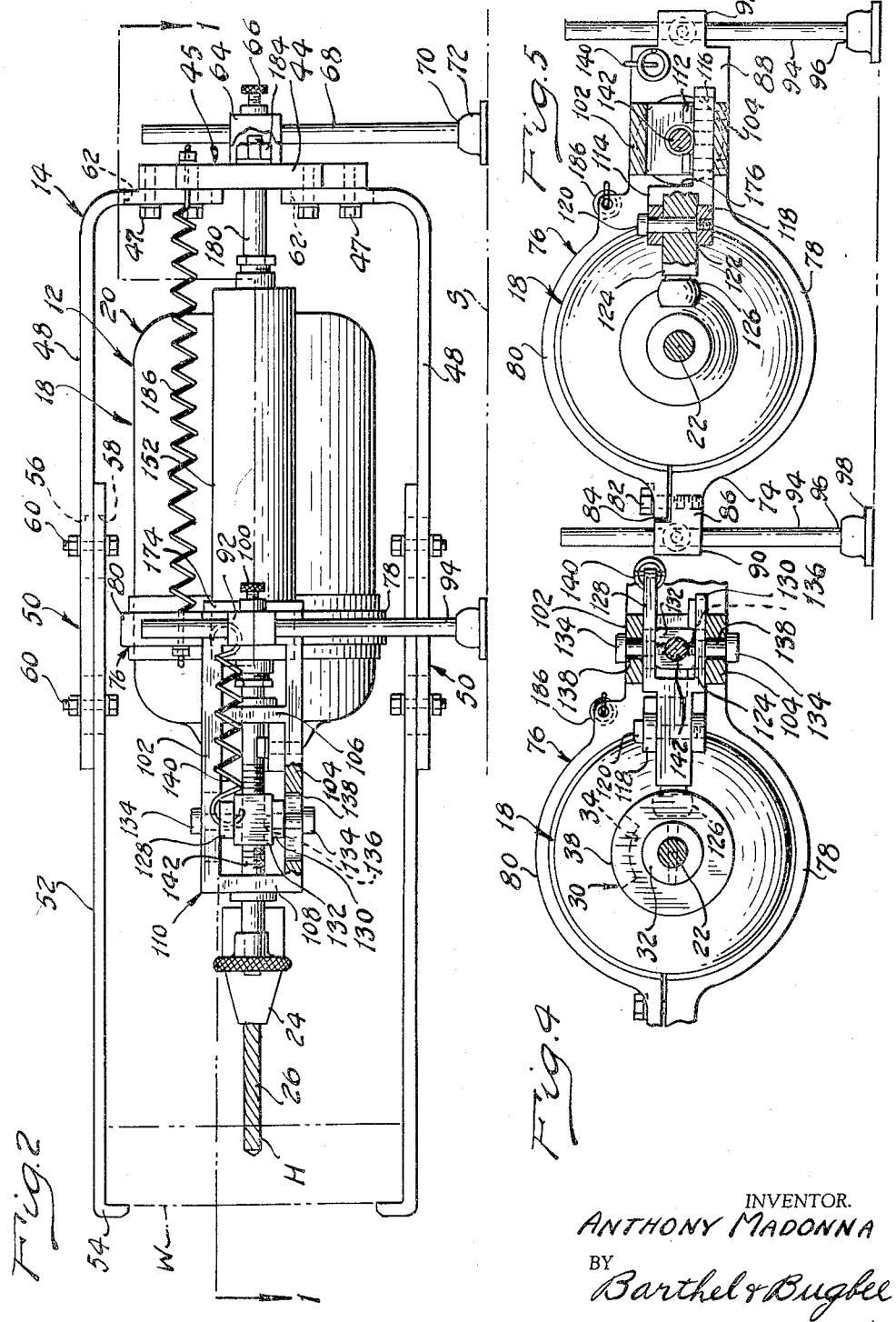

United States Patent Office 3,024,671
Patented Mar. 13, 1962

3,024,671
AUTOMATIC DRILLING APPLIANCE FEEDING ATTACHMENT
Anthony Joseph Madonna, 1340 N. Franklin Ave., Dearborn, Mich.
Filed Nov. 3, 1958, Ser. No. 771,323
6 Claims. (Cl. 77—33.5)

This invention relates to portable power-operated drilling appliances and, in particular, to automatic feeding attachments for such drilling appliances.

One object of this invention is to provide an automatic feeding attachment for an electric portable drilling appliance which is responsive to the rotation of the shaft which rotates the drilling tool to feed the drilling tool into the work at a predetermined and adjustable feeding speed.

Another object is to provide an automatic feeding attachment of the foregoing character wherein the feeding action is effected by a hydraulic piston and cylinder, the piston of which is reciprocated by engagement with a cam on the shaft which rotates the drilling tool, so as to cause the cylinder to move the motor and the drilling tool connected thereto in a forward feeding direction into the work as the result of the reciprocation of the piston in the cylinder.

Another object is to provide an automatic feeding attachment of the foregoing character whereby the actuating member which transmits motion from the cam on the drill shaft to the piston rod is adjustably movable so as to increase or decrease the length of contact with the cam and consequently increase or decrease the length of stroke imparted by the cam to the piston rod in order to increase or decrease the feeding speed of the drilling appliance toward the work.

Other objects and advantages of the invention will become apparent during the course of the following description of the accompanying drawings, wherein:

FIGURE 1 is a horizontal section, partly on top plan view, of an automatic feeding attachment for a portable electric drilling appliance, shown as attached thereto, taken along the line 1—1 in FIGURE 2, according to one form of the invention;

FIGURE 2 is a side elevation of the assembly shown in FIGURE 1;

FIGURE 3 is a right-hand end elevation of the assembly shown in FIGURE 1;

FIGURE 4 is a vertical cross-section taken along the line 4—4 in FIGURE 1; and

FIGURE 5 is a vertical cross-section taken along the line 5—5 in FIGURE 1.

Referring to the drawings in detail, FIGURES 1 and 2 show an automatic feeding attachment, generally designated 10, according to one form of the invention for a portable electric motor-driven drilling appliance, generally designated 12, the assembly thereof being generally designated 14. The portable electric drilling appliance 12 is conventional except for a guide shaft 16 attached to the rearward end thereof, and its details are beyond the scope of the present invention. The portable electric drilling appliance 12 consists of the usual electric motor 18 having a casing 20 in which the motor armature shaft 22 is journaled. Mounted on the armature shaft 22 is the usual drill chuck 24 for receiving and clamping a selected conventional drilling tool 26, such as an ordinary twist drill. The chuck 24 is held in position on the threaded end of the motor shaft or armature shaft 22 by a knurled lock nut 28. Also mounted on the armature shaft 22 between the motor 18 and the chuck 14 is a rotary eccentric element or face cam 30, the hub 32 of which is pinned or otherwise drivingly secured to the shaft 22 and the eccentric portion or rise 34 of which projects rearwardly from the cam disc 38.

The guide shaft 16 is seated in and projects rearwardly from a boss 40 (FIGURE 1) on the rearward end of the motor casing 20 and replaces the usual handle (not shown). The shaft 16 passes through and slidably engages a sleeve bearing 42 mounted in a vertical bar 44 of a cross-shaped back plate 45 (FIGURE 3) which is centrally-drilled to receive it, and which has a vertical bar 46. Bolted or otherwise secured as at 47 to the upper and lower ends of the vertical bar 44 are the rearward bracket halves 48 of work-gripping brackets, generally designated 50, the forward bracket halves 52 of which have hooks 54 at their forward ends for engaging and gripping a workpiece W, such as a beam. The rearward and forward bracket halves 48 and 52 overlap and are slotted as at 56 and 58 respectively for longitudinal adjustment and clamping by means of bolts 60, whereas the rearward bracket halves 48 are L-shaped and slotted as at 62 for providing a transverse adjustment in which they are clamped by the bolts 47. In this manner, the brackets 50 are adjusted to varying conditions and widths of workpieces W.

The horizontal bar 46 of the cross-shaped plate 45 at its forward end carries vertically-drilled bosses 64 (FIGURE 1) which are transversely drilled and threaded to receive clamping screws 66 by which the plate 45 may be clamped at any desired height upon the parallel vertical posts 68 of rearward stanchions 70 having bases 72 adapted to rest upon the surface S of a table or other horizontal support. Secured to the motor casing 20 is the central annular portion 74 of a bracket, generally designated 76 (FIGURE 5), having separable approximately semi-circular lower and upper portions 78 and 80, the latter being detachable from the former in order to insert the motor 18 therein, and secured to one another by a locking bolt 82 which is inserted through the radially projecting arm 84 on the outer end of the semi-circular upper portion 80 and threaded into the suitably drilled and threaded radially-projecting arm 86 on the lower semi-circular portion 78. The latter on its opposite side diametrically opposite the radially-projecting arm 86 is provided with a second and longer radially-projecting arm 88. The radially-projecting arms 86 and 88 at their outer ends carry vertically-bored bosses 90 and 92 respectively (FIGURE 1) which adjustably receive the vertical posts 94 of forward stanchions 96 having bases 98. The bosses 90 and 92 are drilled and threaded transversely to receive clamping screws 100 by which they may be clamped in any desired position of vertical adjustment.

Extending forwardly from the radially-projecting arm 88 of the bracket 76 are upper and lower members 102 and 104 respectively interconnected by cross members 106 and 108 to form an open-centered rectangular frame, generally designated 110. Bolted as at 112 to the frame member 104 is an L-shaped angle bracket 114 which is slotted as at 116 for providing lateral or transverse adjustment. The outer end of the angle bracket 114 is yoked as at 118 and drilled and threaded to receive a pivot screw 120 which passes through a vertical hole 122 intermediate the opposite ends of a cam follower lever 124, the forward end of which carries a rotatable cam follower roller 126 engageable with the cam rise or hump 34 of the face cam disc 38 (FIGURE 1). The rearward end of the cam follower lever 124 is twin-armed or bifurcated as at 128, the parallel arms being slotted as at 130 and carrying between them a nut 132 pivotally held in the slots 130 by upper and lower shoulder screws 134 engaging sockets 136, which transmit the oscillations of the lever 124 to the nut 132, the upper and lower sides of which are drilled and threaded to receive the shoulder screws 134. The slots 130 allow for the arcuate swinging of the cam follower lever 124. Secured to the free end of the upper arm 128 is the forward end of a tension spring 140, the opposite end of which is anchored to the projection 88 (FIGURE 1).

Threaded through the nut 132 is the threaded piston rod 142 of a pumping piston 144, the rod 142 on its outer end carrying a knurled hand wheel or knob 146 pinned thereto. The piston 144 is reciprocably mounted in the pumping cylinder bore 150 of a hydraulic cylinder 152, which also contains a feeding cylinder bore 154 connected to the pumping bore 150 by a fluid passageway 156 containing a spring-urged ball check valve 158. The pumping cylinder bore 150 is in turn connected to a fluid reservoir 160 in the cylinder 152 by a fluid passageway 162 containing a spring-urged ball check valve 164. A bypass passageway 166 closed by a bypass valve 168 extends from the inner end of the feeding cylinder bore 154 to the fluid reservoir 160. The outer end of the feeding cylinder bore 154 is vented to the atmosphere through a port 170, whereas the inner end of the pumping cylinder bore 150 is vented to the atmosphere by a pasageway 172 through the piston rod 142.

The cylinder 152 is flanged as at 174 by which it is bolted to the projection 88 of the bracket 76 which has an opening 176 for the passage of the cylinder 150. Also reciprocably mounted in the cylinder 152 is a thrust piston head 178 attached to the inner end of a thrust piston rod 180, the reduced diameter outer end 182 of which passes through the suitably-drilled horizontal arm 46 of the cross-shaped back plate 45 and is threaded beyond it to receive a nut 184. The bracket 76 is resiliently urged toward the back plate 45 by a tension spring 186, the forward end of which is connected to the bracket 75 and the rearward end to the back plate 45.

In the operation of the invention, let it be assumed that the feeding attachment 10 has been secured to the drilling appliance 12 and that the hooked portions 54 of the work-gripping brackets 50 have been hooked over the rearward corners of a workpiece W, such as a beam in a house being constructed, and that it is desired to drill a hole H in the beam. Assuming that the above-described adjustments have been made in the brackets 50 relatively to the back plate 45 by means of the bolts 47 and 60 so that the drilling tool 26 is properly located to drill the hole H in the desired position in the workpiece W, the operator adjusts the position of the cam roller 126 relatively to the pump 34 on the cam 30 to give the desired length of stroke to the cam follower lever 124 by rotating the knurled hand wheel 146 and the pumping piston rod 142 in one direction or the other, as required. The operator then connects the motor 18 to a suitable source of electric current, such as an ordinary 110-volt house lighting circuit, and closes the switch to energize and operate the motor 18.

The consequent rotation of the armature shaft 22 and face cam 30 causes rotation of the rise or hump 34 thereof as well as rotation of the chuck 24 and drilling tool 26 mounted therein, such as an ordinary twist drill. Each time the cam hump 34 makes one revolution, it engages the cam follower roller 126 to swing the cam follower lever 124 in a clockwise direction around its pivot screws 120, thereby reciprocating the pumping piston rod 142 and consequently pumping hydraulic fluid through the passageway 162 from the reservoir 160 and into the pumping bore 150 and thence through the passageway 156 into the thrust cylinder bore 154 in small quantities at each stroke. The gradual filling of the thrust cylinder bore 154 with hydraulic fluid reacts against the piston head 178 of the thrust piston rod 180, causing the thrust cylinder 152 to move gradually to the left by fine increments. This motion is transmitted through the bracket 76 to the motor 18 of the drilling appliance 12, causing the latter to move the twist drill 26 to the left into the work W at a feeding rate, consequently drilling the hole H in the desired location and at the desired feeding speed.

When the drilling has been completed, the operator turns the bypas valve 168 to open the bypass passageway 166. The tension spring 186 then retracts the hydraulic cylinder 152, the surplus oil or other hydraulic fluid being returned to the fluid reservoir 160 from the motive cylinder bore 154 through the now-open bypass passageway 166.

While the present invention has been described in its most useful application, namely to portable drilling appliances, it will also be evident to those skilled in the machine tool art that the present invention may also be attached to a stationary drill press for feeding the drill chuck thereof into the work.

What I claim is:

1. An automatic feeding attachment for a portable motor-driven rotary drilling appliance, comprising a frame adapted to be detachably attached to the appliance, a rotary eccentric element adapted to be drivingly connected to a rotatable part of the appliance for rotation thereby, an eccentric element follower oscillatably mounted on said frame in engagement with said eccentric element, a feeding cylinder member, a feeding piston member reciprocably mounted in said feeding cylinder member, a stationary abutment structure connected to one of said members, the other member being operatively connected to said frame, a hydraulic pumping cylinder member mounted on said frame and hydraulically connected to said feeding cylinder member, and a pumping piston member reciprocably mounted in said pumping cylinder member, said pumping piston member being operatively connected to said eccentric element follower and responsive to the motion of said eccentric element follower upon rotation of said eccentric element for pumping hydraulic fluid under pressure into said feeding cylinder member whereby to reciprocate said feeding cylinder and piston members relatively to one another to impart feeding motion to said frame and appliance, said pumping piston member being adjustably rotatable and having a threaded portion thereon and a nut engaging said threaded portion, said rotary element follower being operatively connected to said nut.

2. An automatic drilling appliance feeding attachment, according to claim 1, wherein said nut has a pivot element thereon and wherein said cam follower operatively engages said pivot element.

3. An automatic feeding attachment for a portable motor-driven rotary drilling appliance, comprising a frame having a mounting device thereon adapted to detachably engage the appliance, a rotary eccentric element adapted to be drivingly connected to a rotatable part of the appliance for rotation thereby, an eccentric element follower oscillatably mounted on said frame in engagement with said eccentric element, a feeding cylinder member, a feeding piston member reciprocably mounted in said feeding cylinder member, a stationary abutment structure connected to one of said members, the other member being operatively connected to said frame, a hydraulic pumping cylinder member mounted on said frame and hydraulically connected to said feeding cylinder member, and a pumping piston member reciprocably mounted in said pumping cylinder member, said pumping piston member being operatively connected to said eccentric element follower and responsive to the motion of said eccentric element follower upon rotation of said eccentric element for pumping hydraulic fluid under pressure into said feeding cylinder member whereby to reciprocate said feeding cylinder and piston members relatively to one another to impart motion to said frame and appliance, said pumping piston member and pumping piston cylinder being disposed with their axes parallel to the axis of rotation of the rotatable part of the appliance and said eccentric element follower being pivotally mounted on said frame for swinging motion relatively thereto in motion-transmitting relationship between said rotary eccentric element and said pumping piston member.

4. An automatic drilling appliance feeding attachment, according to claim 3, wherein said pumping cylinder member and pumping piston member are also disposed with their axes parallel to the axis of rotation of the rotatable part of the appliance.

5. An automatic drilling appliance feeding attachment, according to claim 4, wherein said pumping piston member, pumping piston cylinder, feeding piston member and feeding piston cylinder are disposed coaxial with one another relatively to said frame.

6. An automatic feeding attachment for a portable motor-driven rotary drilling appliance, comprising a frame having a mounting device thereon adapted to detachably engage the appliance, a rotary eccentric element adapted to be drivenly connected to a rotatable part of the appliance for rotation thereby, an eccentric element follower oscillatably mounted on said frame in engagement with said eccentric element, a feeding cylinder member, a feeding piston member reciprocably mounted in said feeding cylinder member, a stationary abutment structure connected to one of said members, the other member being operatively connected to said frame, a hydraulic pumping cylinder member mounted on said frame and hydraulically connected to said feeding cylinder member, and a pumping piston member reciprocably mounted in said pumping cylinder member, said pumping piston member being operatively connected to said eccentric element follower and responsive to the motion of said eccentric element follower upon rotation of said eccentric element for pumping hydraulic fluid under pressure into said feeding cylinder member whereby to reciprocate said feeding cylinder and piston members relatively to one another to impart motion to said frame and appliance, said mounting device including a mounting structure at least partially encircling the appliance in gripping engagement therewith.

References Cited in the file of this patent
UNITED STATES PATENTS

| 2,559,125 | Lee | July 3, 1951 |
| 2,643,555 | Steibel | June 30, 1953 |
| 2,928,297 | Svenson | Mar. 15, 1960 |

FOREIGN PATENTS

| 158,482 | Germany | Feb. 15, 1905 |